(12) United States Patent
Spurgeon (10) Patent No.: US 12,280,551 B2
(45) Date of Patent: Apr. 22, 2025

(54) DEEP LEAD HEAT STAKING DEVICE AND METHOD

(71) Applicant: Alex Spurgeon, Grove City, OH (US)

(72) Inventor: Alex Spurgeon, Grove City, OH (US)

( * ) Notice: Subject to any disclaimer, the term of this patent is extended or adjusted under 35 U.S.C. 154(b) by 46 days.

(21) Appl. No.: 18/361,867

(22) Filed: Jul. 30, 2023

(65) Prior Publication Data

US 2025/0033294 A1  Jan. 30, 2025

(51) Int. Cl.
*B29C 65/30* (2006.01)
*B29C 65/00* (2006.01)
*B29C 65/20* (2006.01)
*B29C 65/60* (2006.01)

(52) U.S. Cl.
CPC .............. *B29C 65/30* (2013.01); *B29C 65/20* (2013.01); *B29C 65/606* (2013.01); *B29C 66/81422* (2013.01)

(58) Field of Classification Search
None
See application file for complete search history.

(56) References Cited

U.S. PATENT DOCUMENTS

2020/0156329 A1\* 5/2020 Spurgeon .......... B29C 66/92311

\* cited by examiner

*Primary Examiner* — Jacob T Minskey
*Assistant Examiner* — Adrianna N Konves
(74) *Attorney, Agent, or Firm* — Steven A. Hill (57) ABSTRACT

A novel heat staking device particularly configured for use in impulse staking, resulting in faster achievement of required temperatures at a forming dome.

4 Claims, 7 Drawing Sheets

-- PRIOR ART --

DEEP LEAD HEAT STAKING DEVICE AND METHOD

CROSS-REFERENCE TO RELATED APPLICATIONS

This application claims the benefit of U.S. Provisional Application No. 63/370,134, filed on Aug. 2, 2022.

STATEMENT REGARDING FEDERALLY SPONSORED RESEARCH AND DEVELOPMENT

No federally sponsored research and development.

BACKGROUND OF THE INVENTION

The present disclosure relates to a novel device and method enabling impulse plastic heat staking.

The purpose of plastic heat staking is to bond one part to another part with a "boss" or other joining feature that is heated and formed into a dome shape that creates a mechanical bond. The unformed boss starts out as a post of any geometric shape upstanding from the sheet of another surface, such as a part, from which it is upstanding. In the present case, the boss is placed in a hole or other mating feature on a second part to which the boss-carrying part is to be attached or mated. This mating part can be made from a wide range of materials. Using heat from a probe, the boss is formed into a shape that is larger than the size of the opening through which it protrudes. The flattening or enlarging of the boss generates a mechanical bond whereby the two parts are inseparable unless excessive force is placed on the deformed (enlarged) boss.

Plastic heat staking or "heat forming" has been an assembly method for decades and can be done in a variety of methods including, for example, ultrasonic staking, hot air cold staking, hot probe heat staking, infrared staking, impulse staking, and the like. There are many staking methods and each method has its own advantages and disadvantages. What all staking methods share in common is the requirement of inputs that dictate the staking cycle.

Impulse staking is one method of heat staking that uses resistance heating to heat up a forming tip which will then form the boss. This works by passing a low voltage alternating current through the circuit, essentially shorting out at the tip and generating heat.

The impulse method of staking has eliminated many problems other methods, but at least two problems remain: heating inefficiencies space needed for leads. The challenge has been the efficiency of the heating and being able to keep the wires small enough to fit inside a system.

Therefore, a need exists in the field of heat staking for more efficient heating and more convenient lead placement. The present disclosure improves the efficiency of the heating pattern and the energy usage (roughly 75% more efficient than in previous methods).

SUMMARY OF THE INVENTION

The present disclosure comprises a novel device that enables efficient impulse staking. The problem of lead placement is solved by having of portion of the leads, as deep leads, connected inside the forming tube. The problem of efficiency is solved by having the electricity from the deep leads delivered close to the forming tip, where electrical resistance is highest; thus, creating heat more efficiently at the interface of the tip and the material to be heated. The shorter the distance that electrical current must travel to the place where the heat is needed, the faster that place reaches a desired temperature.

BRIEF DESCRIPTION OF DRAWINGS

For a fuller understanding of the nature and advantages of the present method and process, reference should be had to the following detailed description taken in connection with the accompanying drawings, in which.

DETAILED DESCRIPTION OF THE INVENTION

In the following detailed description, reference is made to the accompanying drawings, which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosure. The following detailed description, therefore, is not to be taken in a limiting sense, and the scope of the present disclosure is defined only by the appended claims, along with the full scope of equivalents to which such claims are entitled.

A "lead" is an electrical conductor.

A "deep lead" is a specially-shaped electrical lead, generally half of a tube, cut longitudinally, and shaped to fit inside a forming tip. Each deep lead is electrically and mechanically connected, at its proximal end, to a lead that in turn conducts electricity to the deep lead. Each deep lead is electrically and mechanically connected to a corresponding lead, typically via brazing, at the proximal end of the deep lead.

A "forming tip" is an electrically conductive, generally U-shaped, two-branch device with a proximal "open end" and a distal "closed end." It receives one deep lead on one branch at the open end and another deep lead on the other branch at the open end. The forming tip is electrically and mechanically connected to the deep leads typically via brazing.

The forming tip thus provides a closed circuit for electricity flowing from one deep lead to the other deep lead.

A "forming dome" is concave impression at the closed end of the forming tip, shaped to produce a dome shape in a boss when the boss reaches melting temperature produced by the forming tip. Being U-shaped, the forming tip includes a "slot" between the two branches, thus ensuring that electricity flows through the forming dome from one branch to the other. Further, the slot provides for air convection to allow for cooling of the tip and material.

The following reference numbers are used in the figures and accompanying descriptions.
10 prior art
12 forming tip
14 lead
16 forming dome
100 deep lead staking device
102 first lead
103 second lead
104 first deep lead
105 second deep lead
106 forming tip
108 forming dome
110 slot
118 first notch
119 second notch
120 open end
122 closed end
140 table
141 prior art data
142 deep lead data The basic operation of any heat staking device is that electricity is provided to a forming tip. The forming tip creates a short circuit, which in turn produces heat needed to melt or otherwise form the boss.

Figure 1:
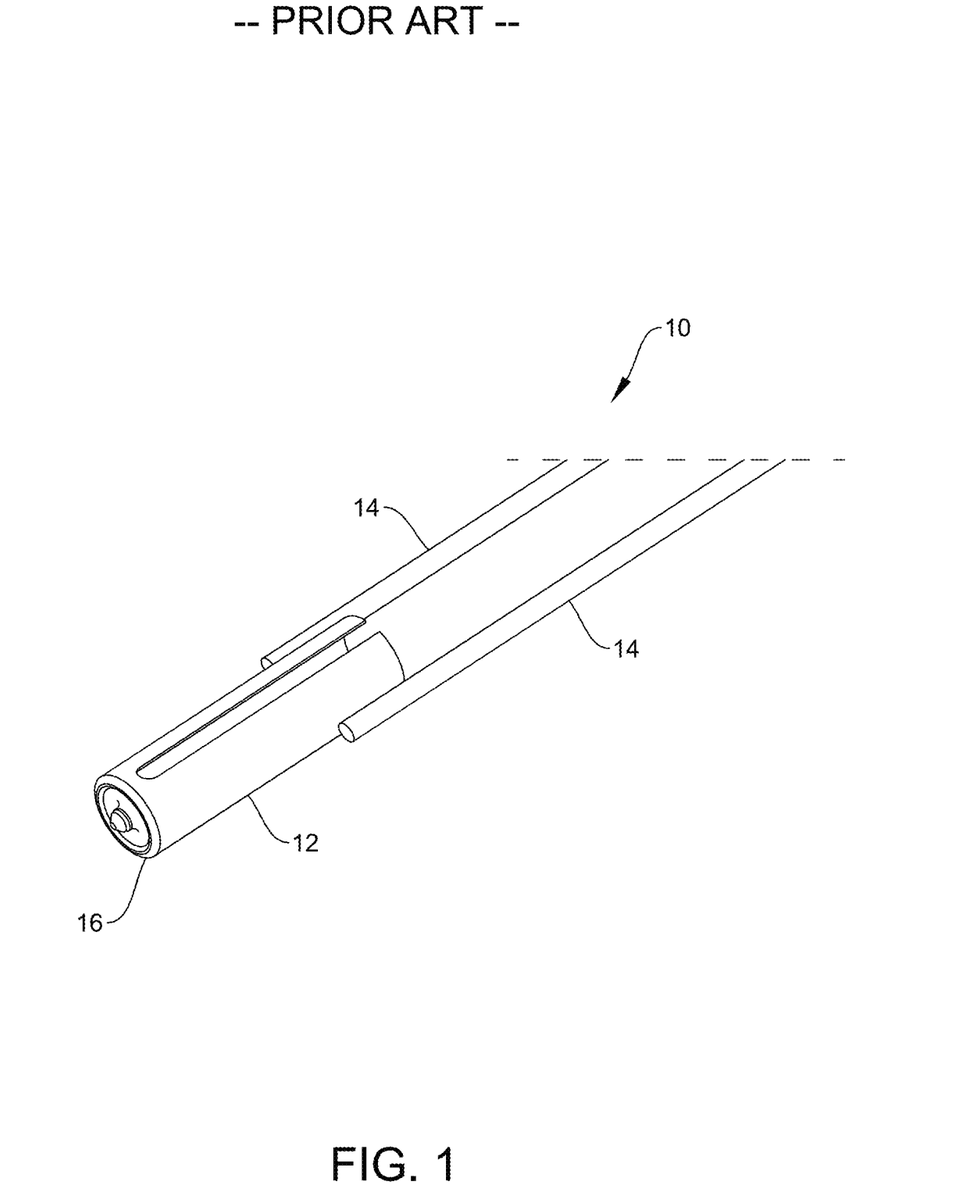
FIG. 1 is a perspective view of the prior art.

FIG. 1 shows the prior art 10. Forming tip 12 has leads 14 connected a relatively long distance, compared to forming tip 12 length, away from forming dome 16. Thus, the resulting electrical resistance, and the heat that comes with it, is distributed through the forming tip 12, between one lead 14 to the other lead 14. The heat begins at the places where the leads 14 connect to the forming tip 12. Heat that is not at the forming dome 16 is wasted. Also wasted is the time needed to reach desired temperatures at the forming dome 16. Notice, further, that leads 14 are attached to the outside surface of forming tip 12.

Figure 2:
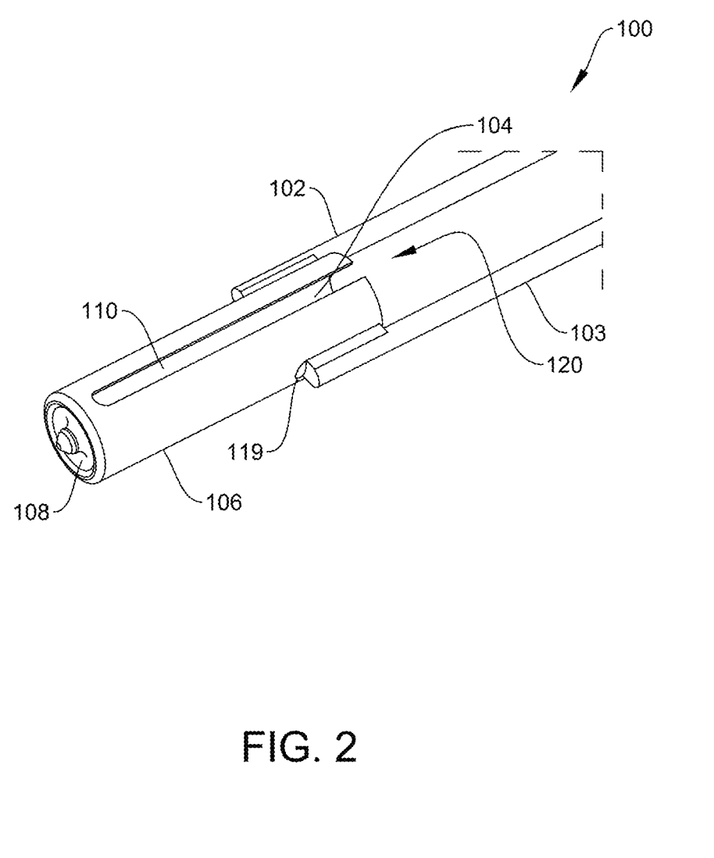
FIG. 2 is perspective view of the device.
Figure 4:
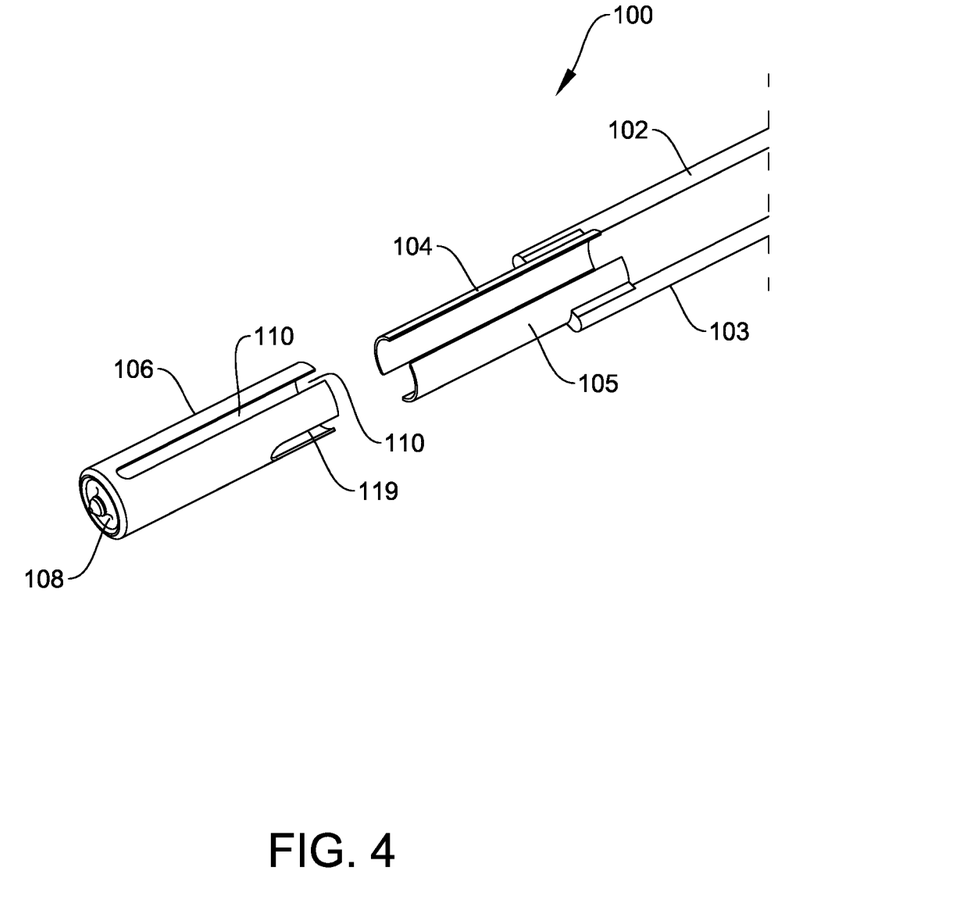
FIG. 4 is an exploded perspective view.

FIG. 2 shows deep lead staking device 100. Forming tip 106 and forming dome 108 have interior and exterior surfaces. First lead 102 and second lead 103 are connected, respectively, to first deep lead 104 and deep lead 105 (not shown here, but better shown in FIG. 4). Deep leads 104 and 105 (FIG. 4) are generally semicircular tube sections, designed to fit inside forming tip 106. Leads 102 and 103 and deep leads 104 and 105 (FIG. 4) are relatively highly electrically conductive compared to forming tip 106. A first notch 118 is provided for first lead 102 and first deep lead 104 enables electrical connection of first deep lead 104 to the interior surface of forming tip 106. In the same way, a second notch 119 is provided for second lead 103 and second deep lead 105 (FIG. 4) enables electrical connection of second deep lead 105 (FIG. 4) to the interior surface of forming tip 106. Connection between first deep lead 104 and forming tip 106, and connection between second deep lead 105 (FIG. 4) and forming tip 106, is typically effected by brazing or other means that can withstand the current and temperatures required in impulse staking. Deep leads 104 and 105 (FIG. 4) extend deep into the forming tip 106 to an interior surface of the forming dome 108. As such, electricity from leads 102 and 103 is delivered inside forming tip 106 by deep leads 104 and 105 (FIG. 4). An electrical short circuit is created at the forming dome 108. As shown in FIG. 1, this is directly in contradiction to the prior art 10, where electricity is delivered to the outside of forming tip 12 and at a relatively longer distance from the forming dome 16.

Figure 3A:
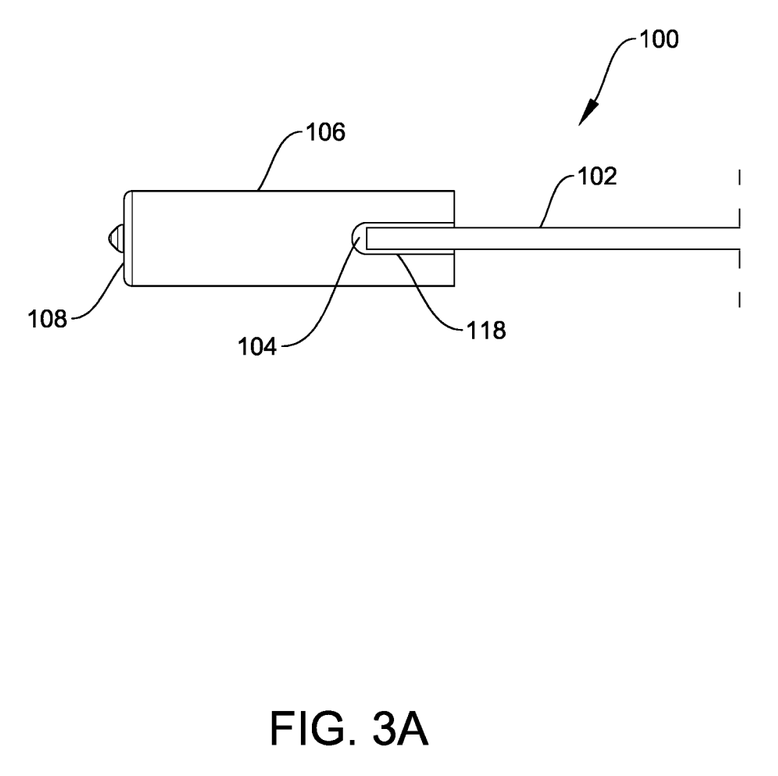
FIG. 3A is a first side view.

FIG. 3A is a first side view of deep lead staking device 100. This view shows first lead 102 connected to first deep lead 104, through a first notch 118 specifically designed to allow first deep lead 104 to be connected electrically to the forming tip 106 from the inside. Not shown, however a corresponding view for the second deep lead 105 and second lead 103 pair similarly includes a second notch 119.

Figure 3B:
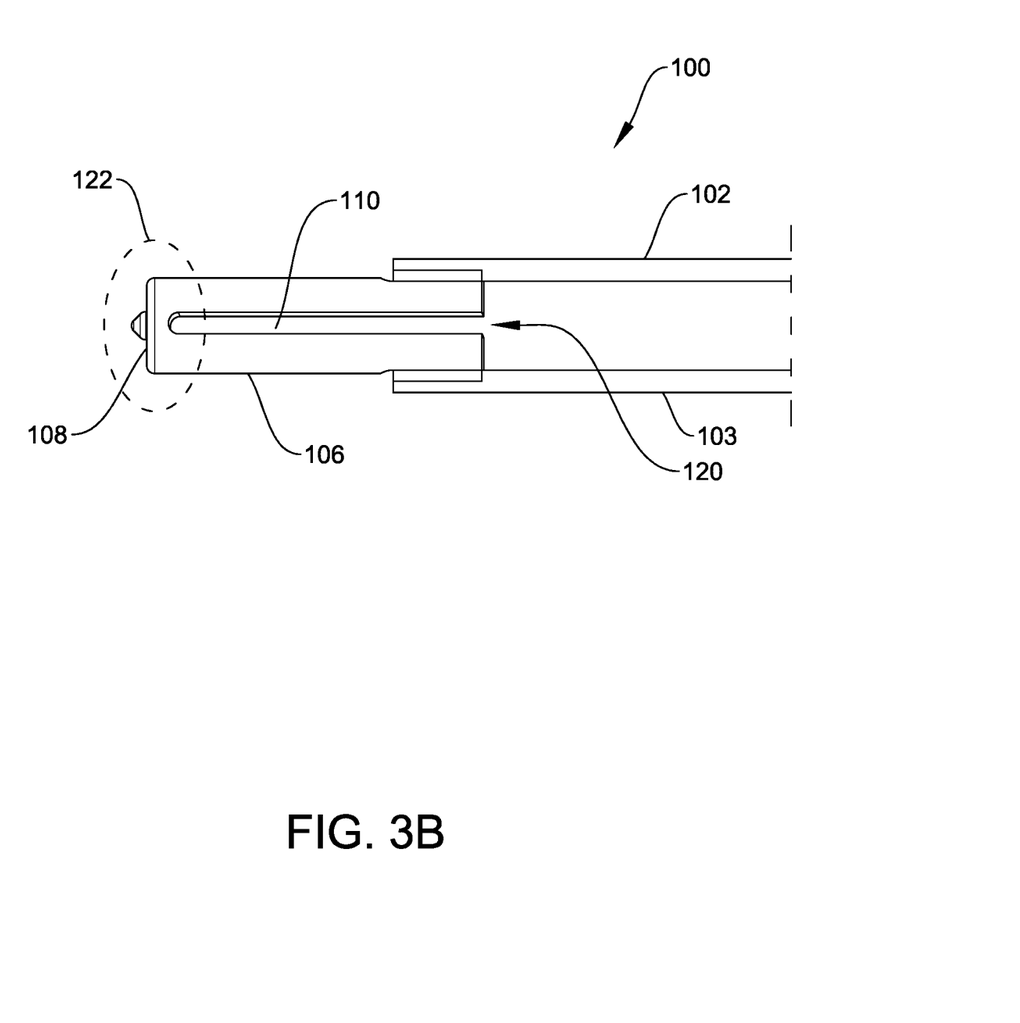
FIG. 3B is a second side view.

FIG. 3B is a second side view of deep lead staking device 100. First lead 102 and second lead 103 are shown. Forming tip 106 is generally cylindrically shaped. Forming tip 106 has an open end 120 and a closed end 122. A slot 110 extends along two sides of forming tip 106, from the open end 120 down the length of the forming tip 106, towards the closed end 122, but not totally. The slot 110 in effect creates the forming tip 106 into two semi-cylindrical sides, and generally, in a "U" shape. Forming dome 108 is at the closed end 122.

FIG. 4 is an exploded, perspective view. Also shown in FIG. 4 is slot 110, for placement reference. Slot 110 is oriented to allow air flow through the assembled deep lead staking device 100. First lead 102 is connected to first deep lead 104 in such a way that first deep lead 104 may slip inside forming tip 106. First notch 118 facilitates that connection. In the same manner, second lead 103 is connected to second deep lead 105 in such a way that second deep lead 105 may slip inside forming tip 106. Similarly, second notch 119 facilitates that connection.

Figure 5:
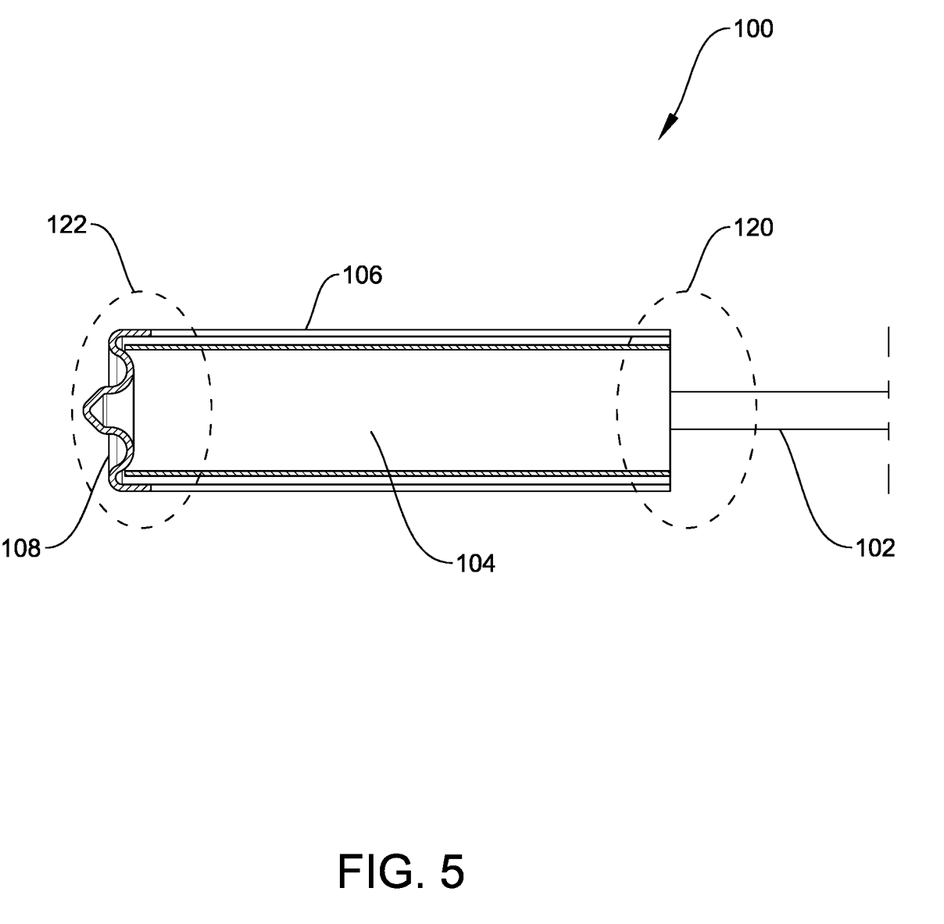
FIG. 5 is a cross-sectional view of the first side view.

FIG. 5 is a cross-sectional view of the first side view (FIG. 3A) showing one side of deep lead staking device 100, and further showing the connection and cooperation among first lead 102, deep lead 104, forming tip 106, and forming dome 108. As shown, first deep lead 104 extend from the open end 120 of forming tip 106 to the interior surface of forming dome 108. Electrical conductivity is relatively high throughout the length of first deep lead 104, resulting in little heat creation along the forming tip 106 except at the forming dome 108. Heat-producing resistivity is relatively high at the forming dome 108, where the heat is needed. These effects apply as well to second lead 103 and second deep lead 105.

Figure 6:
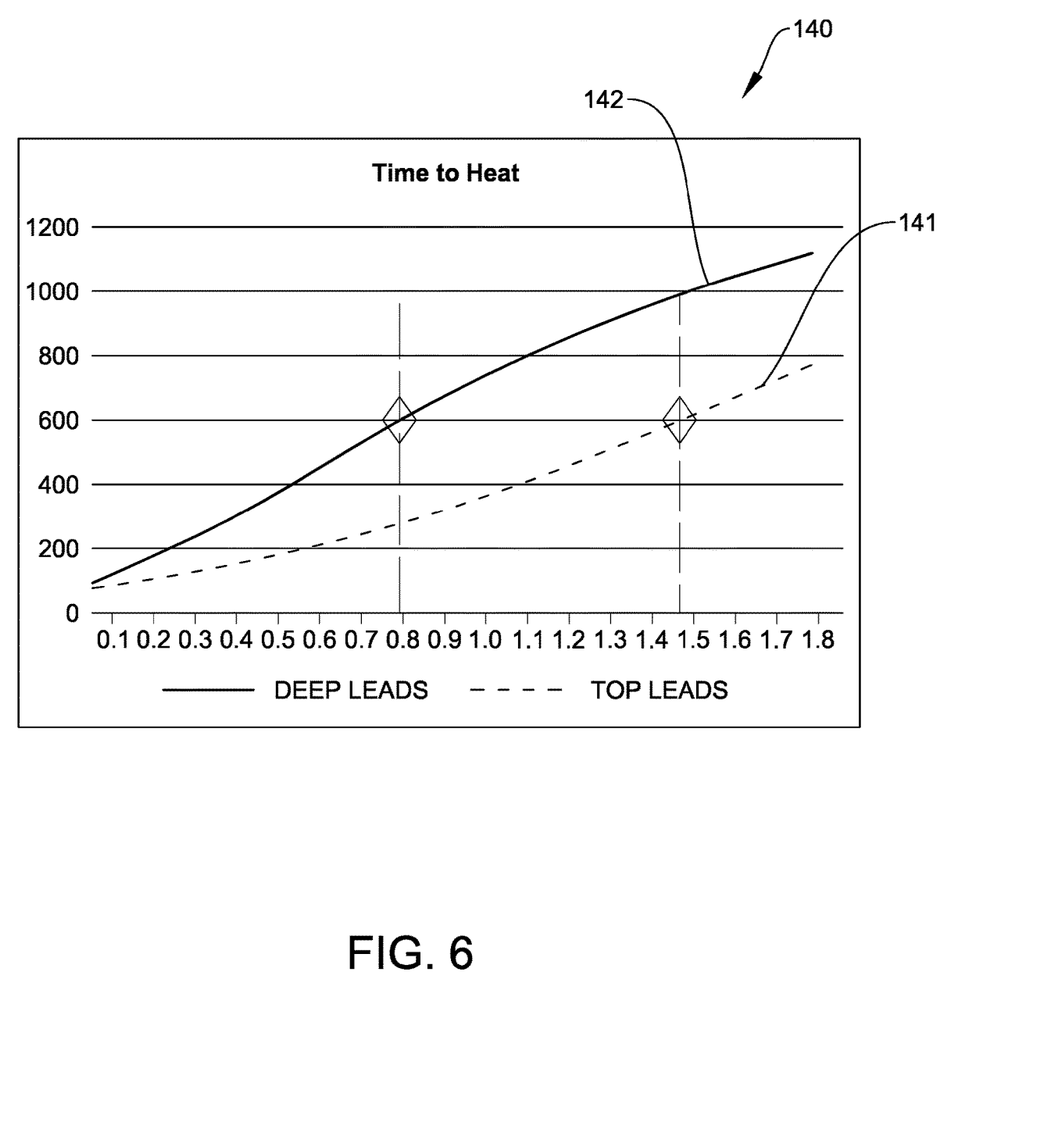
FIG. 6 is a table of test results showing heating efficiency.
The drawings are described in greater detail below.

FIG. 6 is a table showing test data and comparison in heat times between the prior art 10 and the disclosed device 100. Prior art data 141 shows testing results of the prior art device 10. For a target temperature of 600 degrees F., the prior art device 10 requires approximately 1.5 seconds. Deep lead data 142 shows testing results of the deep lead staking device 100. For the deep lead staking device 100, time to reach 600 degrees F. is approximately 0.8 seconds. As a result, the time to accomplish staking is significantly reduced. Further, less energy is wasted in nonproductive heating of parts of the forming tip 106 that do not directly apply heat at the forming dome 108.

Another embodiment of the deep lead staking device 100 would not require the first notch 118 or second notch 119. Alternative first and second leads may be of sufficient gauge to be connected to an interior surface of alternative deep leads. Gauge must be sufficient to carry the required electrical current and to fit inside an alternative forming tip.

Yet another embodiment may also not require a first notch 118 or second notch 119, simply by having a shorter alternative forming tip.

Yet another embodiment may include longer alternative first and second notches, extending deeper along an alternative forming tip, further enhancing electrical conductivity to an alternative forming dome.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. A device used in a heat staking system, comprising:
a first lead;
a second lead;
a first deep lead, having an interior surface and an exterior surface;
a second deep lead, having an interior surface and an exterior surface;
the first lead being electrically and mechanically connected to the exterior surface of the first deep lead;
the second deep lead being electrically and mechanically connected to the exterior surface of the second lead;
a forming tip, having an open end, a closed end, an exterior side, and an interior side;
the forming tip having a forming dome, the forming dome further having an exterior side and an interior side;
the first lead, the second lead, the first deep lead, and the second deep lead having higher electrical conductivity than the forming tip;
the first deep lead and the second deep lead being electrically and mechanically connected to opposite sides of the interior of the forming tip;
a first notch on the forming tip, enabling the first deep lead to be connected to the interior of the forming tip;
a second notch on the forming tip, enabling the second deep lead to be connected to the interior of the forming tip;
the first deep lead and the second deep lead further being elongated to extend from the open end of the forming tip towards the closed end of the forming tip, to the interior of the forming dome;
the forming tip providing an electrical short circuit between each the first deep lead and the second deep lead; and
the short circuit producing heat at the forming dome.

2. The device of claim 1 wherein the first notch and the second notch have a length more than half a distance between the open end and closed end.

3. A device used in a heat staking system, comprising:
a first lead;
a second lead;
a first deep lead, having an interior surface and an exterior surface;
a second deep lead, having an interior surface and an exterior surface;
the first lead being electrically and mechanically connected to the exterior surface of the first deep lead;
the second deep lead being electrically and mechanically connected to the exterior surface of the second lead;
a forming tip, having an open end, a closed end, an exterior side, and an interior side;
the forming tip having a forming dome, the forming dome further having an exterior side and an interior side;
the first lead, the second lead, the first deep lead, and the second deep lead having higher electrical conductivity than the forming tip;
the first deep lead and the second deep lead being electrically and mechanically connected to opposite sides of the interior of the forming tip;
the first deep lead and the second deep lead further being elongated to extend from the open end of the forming tip towards the closed end of the forming tip, to the interior of the forming dome;
the forming tip providing an electrical short circuit between each the first deep lead and the second deep lead; and
the short circuit producing heat at the forming dome.

4. A device used in a heat staking system, comprising:
a first lead;
a second lead;
a first deep lead, having an interior surface and an exterior surface;
a second deep lead, having an interior surface and an exterior surface;
the first lead being electrically and mechanically connected to the interior surface of the first deep lead;
the second deep lead being electrically and mechanically connected to the interior surface of the second lead;
a forming tip, having an open end, a closed end, an exterior side, and an interior side;
the forming tip having a forming dome, the forming dome further having an exterior side and an interior side;
the first lead, the second lead, the first deep lead, and the second deep lead having higher electrical conductivity than the forming tip;
the first deep lead and the second deep lead being electrically and mechanically connected to opposite sides of the interior of the forming tip;
the first deep lead and the second deep lead further being elongated to extend from the open end of the forming tip towards the closed end of the forming tip, to the interior of the forming dome;
the forming tip providing an electrical short circuit between each the first deep lead and the second deep lead; and
the short circuit producing heat at the forming dome.

* * * * *